(12) United States Patent
Shimada et al.

(10) Patent No.: US 8,578,210 B2
(45) Date of Patent: Nov. 5, 2013

(54) SUPPORTING APPARATUS AND SUPPORTING METHOD

(75) Inventors: Kuniaki Shimada, Kawasaki (JP); Yasuhide Matsumoto, Kawasaki (JP); Yukihiro Watanabe, Kawasaki (JP); Yuji Wada, Kawasaki (JP); Masazumi Matsubara, Kawasaki (JP); Kenji Morimoto, Imizu (JP); Hiroshi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 263 days.

(21) Appl. No.: 12/487,364

(22) Filed: Jun. 18, 2009

(65) Prior Publication Data

US 2010/0070795 A1    Mar. 18, 2010

(30) Foreign Application Priority Data

Sep. 12, 2008  (JP) ................................ 2008-235129

(51) Int. Cl.
*G06F 11/00* (2006.01)

(52) U.S. Cl.
USPC .......................................................... 714/26

(58) Field of Classification Search
USPC .......................................................... 714/26
See application file for complete search history.

(56) References Cited

U.S. PATENT DOCUMENTS

| | | | |
|---|---|---|---|
| 5,127,005 A | 6/1992 | Oda et al. | |
| 5,463,768 A | 10/1995 | Cuddihy et al. | |
| 7,197,561 B1 | 3/2007 | Lovy et al. | |
| 7,379,846 B1 * | 5/2008 | Williams et al. | 702/185 |
| 7,552,447 B2 * | 6/2009 | Uthe | 719/318 |
| 7,631,222 B2 * | 12/2009 | Hasan et al. | 714/26 |
| 7,856,575 B2 * | 12/2010 | Bock et al. | 714/26 |
| 2007/0156889 A1 * | 7/2007 | Bhrara et al. | 709/224 |
| 2008/0059839 A1 * | 3/2008 | Hamilton et al. | 714/26 |

(Continued)

FOREIGN PATENT DOCUMENTS

| | | |
|---|---|---|
| EP | 1703449 A1 | 9/2006 |
| JP | 08-087412 | 4/1996 |
| JP | 11-143712 | 5/1999 |
| JP | A 11-259331 | 9/1999 |
| JP | A 2006-252567 | 9/2006 |

OTHER PUBLICATIONS

Satoru Yoshida, et al., "Switch Failure Search Using Neural Network Learning—Proposition of Method", The Technical Report of the Proceeding of the Institute of Electronics, Information and Communication Engineers, Japan, Sep. 18, 1991, vol. 91, No. 210, pp. 1-6.

(Continued)

*Primary Examiner* — James Kramer
*Assistant Examiner* — Neil Miles
(74) *Attorney, Agent, or Firm* — Greer, Burns & Crain, Ltd.

(57) ABSTRACT

A supporting apparatus includes a configuration-information storage unit having stored therein dependencies among devices in association with a list of the devices. When information about a device where a failure has occurred is input, a dependency among devices including the faulty device is obtained from the configuration-information storage unit. Based on the obtained dependency among devices including the faulty device and information about the faulty device, learning data with the dependency and a cause of failure being associated with each other is created. Then, based on the created learning data, a solution procedure indicative of a procedure for specifying the cause of failure is generated by using, for example, algorithm ID3.

17 Claims, 15 Drawing Sheets

(56) References Cited

U.S. PATENT DOCUMENTS

| | | | |
|---|---|---|---|
| 2008/0209269 A1* | 8/2008 | Brodie et al. | 714/26 |
| 2009/0037771 A1* | 2/2009 | Morse et al. | 714/25 |
| 2009/0055684 A1* | 2/2009 | Jamjoom et al. | 714/26 |
| 2009/0094484 A1* | 4/2009 | Son et al. | 714/26 |
| 2011/0055620 A1* | 3/2011 | Sengupta | 714/2 |

OTHER PUBLICATIONS

Notice of Rejection mailed Nov. 20, 2012, from corresponding Japanese Patent Application No. 2008-235129, with English translation.

Examination Report under Section 18(3) dated Mar. 21, 2012 from corresponding British Patent Application No. GB0910729.3.

* cited by examiner

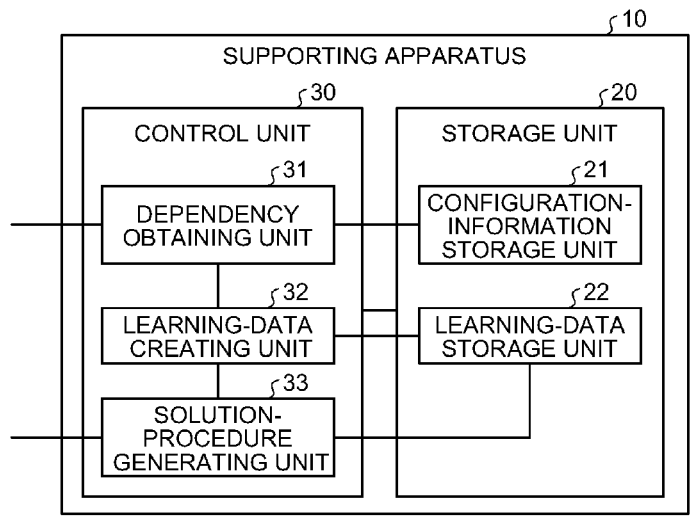

| OBTAINED INFORMATION NAME | OPERATION OF Web | OPERATION OF Ap | OPERATION OF DB | ... | CAUSE OF FAILURE |
|---|---|---|---|---|---|
| CASE 1 | ○ | × | ○ | ... | Ap |
| CASE 2 | ○ | × | × | ... | Ap |
| CASE 3 | ○ | × | × | ... | DB |
| CASE 4 | × | ○ | ○ | ... | Web |
| CASE 5 | × | × | × | ... | Web |
| CASE 6 | ○ | ○ | × | ... | DB |
| CASE 7 | × | ○ | ○ | ... | Web |
| CASE 8 | × | ○ | ○ | ... | Web |
| ⋮ | ⋮ | ⋮ | ⋮ | ⋮ | ⋮ |

FIG.14

| OBTAINED INFORMATION NAME | OPERATION OF WEB | OPERATION OF Ap | OPERATION OF DB | ... | CAUSE OF FAILURE |
|---|---|---|---|---|---|
| CASE 1 | ○ | × | ○ | ... | Ap |
| CASE 2 | ○ | × | × | ... | Ap |
| CASE 3 | ○ | × | × | ... | DB |
| CASE 4 | × | ○ | ○ | ... | Web |
| CASE 5 | ○ | × | × | ... | Web |
| CASE 6 | ○ | ○ | ○ | ... | DB |
| CASE 7 | × | ○ | × | ... | Web |
| CASE 8 | × | ○ | ○ | ... | Web |
| ... | ... | ... | ... | ... | ... |

| OBTAINED INFORMATION NAME | OPERATION OF Web | OPERATION OF Ap | OPERATION OF DB | ... | CAUSE OF FAILURE |
|---|---|---|---|---|---|
| VALUE | × | ○ | ○ | ... | Web |
|  | ○ | × | ○ | ... | Ap |
|  | ○ | ○ | × | ... | DB |
|  | × | × | ○ | ... | Ap |
|  | ○ | × | × | ... | DB |
|  | × | × | × | ... | DB |
|  | ... | ... | ... | ... | ... |

⎛22

| OBTAINED INFORMATION NAME | OPERATION OF Web | OPERATION OF Ap | OPERATION OF DB | ... | CAUSE OF FAILURE | NUMBER OF TIMES OF REFERRING |
|---|---|---|---|---|---|---|
| VALUE | × | ○ | ○ | ... | Web | 2 |
| | ○ | × | ○ | ... | Ap | 3 |
| | ○ | ○ | × | ... | DB | 4 |
| | × | × | ○ | ... | Ap | 2 |
| | ○ | × | × | ... | DB | 5 |
| | × | × | × | ... | DB | 1 |
| | ⋮ | ⋮ | ⋮ | ⋮ | ⋮ | ⋮ |

| OBTAINED INFORMATION NAME | OPERATION OF Web | OPERATION OF Ap | OPERATION OF DB | ... | CAUSE OF FAILURE | MAGNIFYING POWER |
|---|---|---|---|---|---|---|
| CASE 1 | ○ | × | ○ | ... | Ap | 3 |
| CASE 2 | ○ | × | × | ... | Ap | - |
| CASE 3 | ○ | × | × | ... | DB | 5 |
| CASE 4 | × | ○ | ○ | ... | Web | 2 |
| CASE 5 | × | × | × | ... | Web | - |
| CASE 6 | ○ | ○ | × | ... | DB | 4 |
| CASE 7 | × | ○ | ○ | ... | Web | 2 |
| CASE 8 | × | ○ | ○ | ... | Web | 2 |
| ⋮ | ⋮ | ⋮ | ⋮ | ⋮ | ⋮ | ⋮ |

FIG.19

| OBTAINED INFORMATION NAME | OPERATION OF WEB | OPERATION OF Ap | OPERATION OF DB | ... | CAUSE OF FAILURE | MAGNIFYING POWER |
|---|---|---|---|---|---|---|
| CASE 1 | ○ | × | ○ | ... | Ap | 3 |
| CASE 2 | ○ | × | × | ... | Ap | - |
| CASE 3 | ○ | × | × | ... | DB | 5 |
| CASE 4 | × | ○ | ○ | ... | Web | 2 |
| CASE 5 | × | × | × | ... | Web | - |
| CASE 6 | ○ | ○ | ○ | ... | DB | 4 |
| CASE 7 | × | ○ | × | ... | Web | 2 |
| CASE 8 | × | ○ | ○ | ... | Web | 2 |
| ... | ... | ... | ... | ... | ... | ... |

| OBTAINED INFORMATION NAME | OPERATION OF Web | OPERATION OF Ap | OPERATION OF DB | ... | CAUSE OF FAILURE | NUMBER OF TIMES OF REFERRING |
|---|---|---|---|---|---|---|
| VALUE | × | ○ | ○ | ... | Web | 2 |
|  | ○ | × | ○ | ... | Ap | 3 |
|  | ○ | ○ | × | ... | DB | 4 |
|  | × | × | ○ | ... | Ap | 2 |
|  | ○ | × | × | ... | DB | 5 |
|  | × | × | × | ... | DB | 1 |
|  | ... | ... | ... | ... | ... | ... |

FIG.20
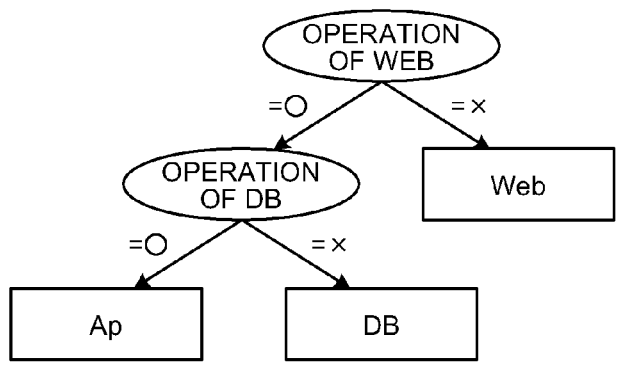
FIG.21A
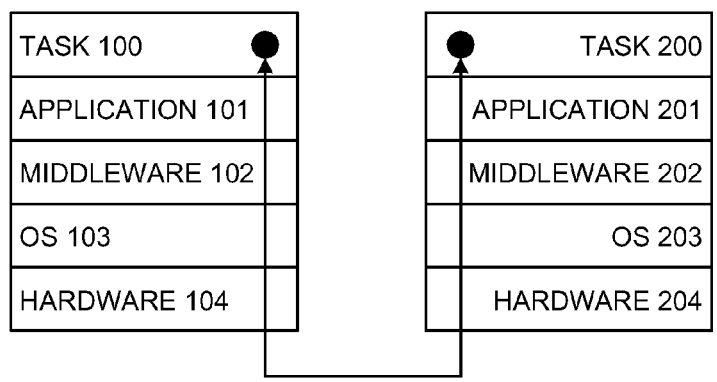
FIG.21B
TASK 100→APPLICATION 101→MIDDLEWARE 102→OS 103→HARDWARE 104
TASK 200→APPLICATION 201→MIDDLEWARE 202→OS 203→HARDWARE 204

SUPPORTING APPARATUS AND SUPPORTING METHOD

CROSS-REFERENCE TO RELATED APPLICATION

This application is based upon and claims the benefit of priority of the prior Japanese Patent Application No. 2008-235129, filed on Sep. 12, 2008, the entire contents of which are incorporated herein by reference.

FIELD

The embodiments discussed herein are directed to a supporting apparatus and a supporting method for handling a failure trouble among a plurality of devices.

BACKGROUND

In recent years, in operation management of an Information Technology (IT) system using IT and in support and problem and task management with Information Technology Infrastructure Library (ITIL), which is a guideline for operation management of the IT system, there is a troubleshooting system that presents a method of solving various troubles.

For example, as depicted in FIG. 24, the troubleshooting system retains procedures for trouble solution created from previous troubleshooting cases and others to present a trouble solving method. When failure information indicative of a trouble phenomenon is input, the troubleshooting system presents the method for solving the trouble. FIG. 24 is a diagram for explaining a troubleshooting system according to a conventional technology.

Also, for example, as depicted in FIG. 25, the troubleshooting system explained above is provided in an inquiry desk (such as a call center) that accepts inquiries from customers about the system and system failure information. When an inquire about a trouble is made from a customer (refer to (1) in FIG. 25), an operator in the call center uses the troubleshooting system to refer to trouble solution methods and reply to the customer (refer to (2) and (3) in FIG. 25).

Subsequently, the operator registers the inquiry case from the customer as a precedent in a precedent database (refer to (4) in FIG. 25). The content creator then closely investigates data in the precedent database to create a trouble-solution-procedure database retained in the troubleshooting system (refer to (5) in FIG. 25). FIG. 25 is a diagram for explaining the case in which the troubleshooting system according to the conventional technology is applied to a call center.

Also, in the troubleshooting system as explained above, technologies are applied, such as a technology of extracting a set as a cause of failure by tracing a dependency among services potentially in the network to detect a faulty portion and a technology of utilizing previous knowledge data to derive a solution measure for a prescribed phenomenon based on the knowledge data (for example, refer to Japanese Laid-open Patent Publication No. 11-259331 and Japanese Laid-open Patent Publication No. 2006-252567.

However, the conventional technologies explained above pose a disadvantage in which a useful trouble solution procedure cannot be presented. Specifically, while a range in which a service of a predetermined device may have influence on a failure is specified from data and service dependencies among the devices on the network in the conventional technologies, a faulty portion cannot be determined. Moreover, in the conventional technologies, information cannot be obtained on a real-time basis, and the trouble solution procedure cannot be optimized. As a result, in the conventional technologies, a useful trouble procedure cannot be presented.

Furthermore, in the conventional technology depicted in FIG. 25, when the precedents are stored in a free format, it takes some time for the content creator to create a trouble solution procedure.

SUMMARY

According to an aspect of the invention, a supporting apparatus includes a configuration-information storage unit that stores dependencies among devices in association with a list of the devices; a dependency obtaining unit that obtains a dependency among devices including a faulty device from the configuration-information storage unit; a learning-data creating unit that creates, based on the obtained dependency among the devices including the faulty device and information about the faulty device, learning data including the dependency and a cause of failure which are associated with each other; and a solution-procedure generating unit that generates, based on the created learning data, a solution procedure indicative of a procedure for specifying the cause of failure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram of an example of the configuration of a supporting apparatus according to a first embodiment;

FIG. 2 is a diagram of an example of information stored in a configuration-information storage unit;

FIG. 3 is a diagram of an example of information stored in a learning-data storage unit according to the first embodiment;

FIG. 14 is a diagram for explaining the solution-procedure generation process according to the fourth embodiment;

FIG. 19 is a diagram for explaining the solution-procedure generation process according to the fifth embodiment;

FIG. 20 is a diagram of an example of a solution procedure generated in the solution-procedure generation process according to the fifth embodiment;

FIG. 21A is a diagram for explaining a process of extracting dependencies among layers to generate a solution procedure;

FIG. 21B is a diagram of an example of a dependency among a plurality of layers in a prescribed device;

DESCRIPTION OF EMBODIMENTS

Figure 4:
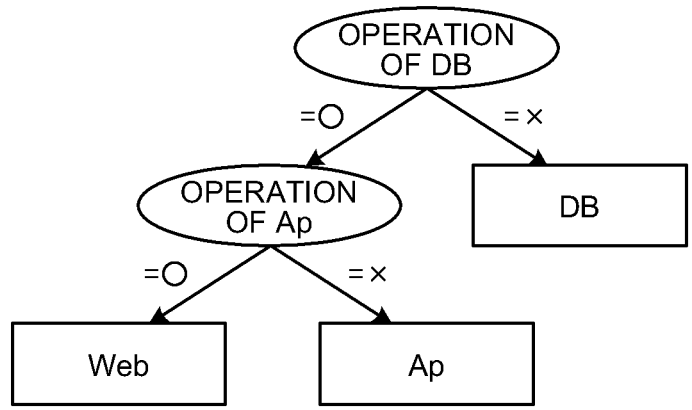
FIG. 4 is a diagram of an example of a solution procedure generated in a solution-procedure generation process according to the first embodiment.

Preferred embodiments of the present invention will be explained with reference to accompanying drawings.

[a] First Embodiment

[General Outline of Supporting Apparatus]

First, a general outline of the supporting apparatus according to a first embodiment is explained. The supporting apparatus disclosed herein is disposed in a call center that accepts, for example, inquiries from customers about a system formed of network devices and failure information of the system. In general, when an inquiry about a system failure is made by a customer, the operator at the call center uses a system for troubleshooting retaining the procedure of solving the system failure to present a trouble solution procedure to the customer.

In the configuration explained above, the supporting apparatus includes a configuration-information storage unit having stored therein dependencies among devices in association with a list of the devices. From the configuration-information storage unit, the supporting apparatus obtains a dependency among the devices including a device where a failure has occurred. Then, based on the obtained dependency among the devices including the faulty device and information about the faulty device, the supporting apparatus creates learning data with the dependencies and a cause of failure being associated with each other. Then, based on the created learning data, the supporting apparatus generates a solution procedure indicative of a procedure for specifying the cause of failure.

Specifically, the supporting apparatus has stored therein a list of devices "Web, Ap, DB" on a network, the devices being formed of, for example, a web server "Web" for viewing by end users, an application server "Ap" for applications that provide services, and a database server "DB" for the applications.

The supporting apparatus includes the configuration-information storage unit that has stored therein dependencies "Consumer: Web, Provider: Ap" and "Consumer: Ap, Provider: DB" indicative of a user side (Consumer) and a provider side (Provider) among the devices in association with the list of devices "Web, Ap, DB".

The information stored in the configuration-information storage unit is collected in advance, for example, manually or by using data at the time of system designing, discovery (Simple Network Management Protocol (SNMP)), diagnostic tool, packet capture, or the like.

When information about devices "Ap" and "DB", where a failure has occurred, is input, the supporting apparatus obtains from the configuration-information storage unit dependencies "Consumer: Web, Provider: Ap" and "Consumer: Ap, Provider: DB" among the devices "Web, Ap, DB" including the faulty devices "Ap" and "DB".

Subsequently, based on the obtained dependencies "Consumer: Web, Provider: Ap" and "Consumer: Ap, Provider: DB" among the devices including the faulty devices and the information about the faulty devices "Ap" and "DB", the supporting apparatus creates learning data with the dependencies and a cause of failure "DB" being associated with each other.

A rule for deriving a cause of failure in the dependency "Consumer: Ap, Provider: DB" is such that, for example, "DB" as Provider is taken as a cause of failure when the faulty devices are "Ap" and "DB". In short, when a failure occurs in "Ap" and "DB", the operation of "Ap" as a consumer side "Consumer" cannot be expected if "DB" as a provider side "Provider" is not operated, and therefore the cause of failure is "DB" as a provider side (Provider).

Then, based on the created learning data, the supporting apparatus generates a solution procedure indicative of a procedure for specifying the cause of failure "DB" by using, for example, an algorithm "Iterative Dichotomiser 3 (ID3)". The solution procedure generated by the supporting apparatus is used as a procedure for solving a failure trouble at the call center.

That is, for shooting a failure trouble in one or more devices, learning data can be created based on the configuration information about the device(s), and a trouble solution procedure can be generated from the generated learning data. As a result, a useful trouble solution procedure can be presented.

[Configuration of Supporting Apparatus]

Next, the configuration of the supporting apparatus according to the first embodiment is explained with reference to FIG. 1. FIG. 1 is a diagram of an example of the configuration of the supporting apparatus according to the first embodiment.

As depicted in FIG. 1, a supporting apparatus 10 includes a storage unit 20 and a control unit 30, and is disposed in, for example, a call center that accepts inquiries from customers about a system configured of network devices, failure information of the system, and others.

The storage unit 20 has stored therein data required for various processes by the control unit 30 and various process results from the control unit 30, and particularly includes a configuration-information storage unit 21 and a learning-data storage unit 22.

The configuration-information storage unit 21 has stored therein dependencies among devices in association with a list of the devices. For example, as depicted in FIG. 2, the configuration-information storage unit 21 has stored therein dependencies "Consumer: Web, Provider: Ap" and "Consumer: Ap, Provider: DB" in association with a list of devices "Web, Ap, DB". FIG. 2 is a diagram of an example of information stored in the configuration-information storage unit 21.

The dependency "Consumer: Ap, Provider: DB" indicates that "Ap" can be operated as "DB" is operated. The dependency "Consumer: Web, Provider: Ap" indicates that "Web" can be operated as "Ap" is operated. In short, "DB", "Ap", and "Web" have a dependency in which "Ap" can be operated as "DB" is operated and "Web" can be operated as "Ap" is operated.

The information stored in the configuration-information storage unit 21 is collected in advance, for example, manually or by using data at the time of system designing, discovery (SNMP), diagnostic tool, packet capture, or the like.

The learning-data storage unit 22 has stored therein dependencies among the devices and a cause of failure in association with each other. Specifically, as depicted in FIG. 3, the learning-data storage unit 22 has stored therein a configuration information name of a device to be obtained, having "operation of Web", "operation of Ap", and "operation of DB" dependent on each other and "cause of failure" in association with each other. FIG. 3 is a diagram of an example of information stored in the learning-data storage unit 22 according to the first embodiment.

For example, the learning-data storage unit 22 has stored therein "operation of Web: x (cross)" (indicating that Web is not operated), "operation of Ap: ○ (circle)" (indicating that Ap is operated), and "operation of DB: ○" (indicating that DB is operated), and "cause of failure: Web" in association with each other. Also for example, the learning-data storage unit 22 has stored therein "operation of Web: ○" (indicating that Web is operated), "operation of Ap: x" (indicating that Ap is not operated), and "operation of DB: x" (indicating that DB is not operated), and "cause of failure: DB" in association with each other. Further, for example, the learning-data storage unit 22 has stored therein "operation of Web: x" (indicating that Web is not operated), "operation of Ap: x" (indicating that Ap is not operated), and "operation of DB: x" (indicating that DB is not operated), and "cause of failure: DB" in association with each other.

The control unit 30 includes an internal memory for storing programs and necessary data having defined therein control programs, various process procedures, and others. Also, in particular, the control unit 30 includes a dependency obtaining unit 31, a learning-data creating unit 32, and a solution-procedure generating unit 33, with which various processes are performed.

The dependency obtaining unit 31 obtains a dependency among the devices including a faulty device from the configuration-information storage unit 21. Specifically, for example, when information about faulty devices "Ap" and "DB" is input, the dependency obtaining unit 31 obtains from the configuration-information storage unit 21 dependencies "Consumer: Web, Provider: Ap" and "Consumer: Ap, Provider: DB" among the devices "Web, Ap, DB" including the faulty devices "Ap" and "DB".

Based on the dependencies among the devices including the faulty devices obtained by the dependency obtaining unit 31 and the information about the faulty devices, the learning-data creating unit 32 creates learning data with the dependencies and the cause of failure being associated with each other.

In the example explained above, specifically for example, based on the dependencies "Consumer: Web, Provider: Ap" and "Consumer: Ap, Provider: DB" among the devices including the faulty devices obtained by the dependency obtaining unit 31 and the information about the faulty devices "Ap" and "DB", the learning-data creating unit 32 creates learning data with the dependencies and the cause of failure "DB" being associated with each other. The learning-data creating unit 32 stores the created learning data in the learning-data storage unit 22.

Here, a rule of deriving a cause of failure in the learning data stored in the learning-data storage unit 22 by the learning-data creating unit 32 is explained for each number of faulty devices.

[Case of One Faulty Device]

First, with the dependencies "Consumer: Web, Provider: Ap" and "Consumer: Ap, Provider: DB", a case in which only "Web" fails, a case in which only "Ap" fails, and a case in which only "DB" fails are explained (refer to FIG. 3).

For example, with the dependencies "Consumer: Web, Provider: Ap" and "Consumer: Ap, Provider: DB", when only "Web" fails ("operation of Web: x", "operation of Ap: ○", and "operation of DB: ○"), the learning-data creating unit 32 derives "Web" as a cause of failure.

Also for example, with the dependencies "Consumer: Web, Provider: Ap" and "Consumer: Ap, Provider: DB", when only "Ap" fails ("operation of Web: ○", "operation of Ap: x", and "operation of DB: ○"), the learning-data creating unit 32 derives "Ap" as a cause of failure.

Furthermore, for example, with the dependencies "Consumer: Web, Provider: Ap" and "Consumer: Ap, Provider: DB", when only "DB" fails ("operation of Web: ○", "operation of Ap: ○", and "operation of DB: x"), the learning-data creating unit 32 derives "DB" as a cause of failure.

That is, with the dependencies obtained by the dependency obtaining unit 31, when only one device fails, the learning-data creating unit 32 derives the faulty device as a cause of failure.

[Case of Two Faulty Devices]

Next, with the dependencies "Consumer: Web, Provider: Ap" and "Consumer: Ap, Provider: DB", a case in which "Web" and "Ap" fail and a case in which "Ap" and "DB" fail are explained (refer to FIG. 3).

For example, with the dependencies "Consumer: Web, Provider: Ap" and "Consumer: Ap, Provider: DB", when "Web" and "Ap" fail ("operation of Web: x", "operation of Ap: x" and "operation of DB: ○"), the learning-data creating unit 32 derives "Ap", which is Provider, as a cause of failure.

Also for example, with the dependencies "Consumer: Web, Provider: Ap" and "Consumer: Ap, Provider: DB", when "Ap" and "DB" fail ("operation of Web: ○", "operation of Ap: x", and "operation of DB: x"), the learning-data creating unit 32 derives "DB", which is Provider, as a cause of failure.

That is, with the dependencies obtained by the dependency obtaining unit 31, when two devices fail, the learning-data creating unit 32 derives the device serving as Provider as a cause of failure among the dependencies among the faulty devices.

[Case of Three or More Faulty Devices]

Next, with the dependencies "Consumer: Web, Provider: Ap" and "Consumer: Ap, Provider: DB", a case in which "Web", "Ap", and "DB" fail is explained (refer to FIG. 3).

For example, with the dependencies "Consumer: Web, Provider: Ap" and "Consumer: Ap, Provider: DB", when "Web", "Ap", and "DB" fail ("operation of Web: x", "operation of Ap: x", and "operation of DB: x"), the learning-data creating unit 32 derives "DB", which is a source, as a cause of failure.

That is, with the dependencies obtained by the dependency obtaining unit 31, when three or more (n layers, where n=3 or greater) devices fail, the learning-data creating unit 32 derives the device serving as Provider, which is a source, as a cause of failure among the dependencies among the faulty devices.

Referring back to FIG. 1, based on the learning data created by the learning-data creating unit 32, the solution-procedure generating unit 33 generates a solution procedure indicative of a procedure for specifying a cause of failure. In the example explained above, specifically, for example, based on the learning data created by the learning-data creating unit 32, the solution-procedure generating unit 33 generates a solution procedure indicative of a procedure for specifying a cause of failure "DB" by using, for example, the algorithm "ID3" (refer to FIG. 4).

The solution procedure generated by the solution-procedure generating unit 33 from the learning data depicted in FIG. 3 is such that, as depicted in FIG. 4, for example, "DB" is taken as a cause of failure when "DB" is not operated and the operation of "Ap" is checked when "DB" is operated. Also, the solution procedure is such that "Ap" is taken as a cause of failure when "Ap" is not operated and "Web" is taken as a cause of failure when "Ap" is operated. FIG. 4 is a diagram of an example of the solution procedure generated in a solution-procedure generation process according to the first embodiment.

In short, by using the solution procedure generated by the solution-procedure generating unit 33, a cause of failure can be optimally checked. In other words, even when "Ap" and "Web" fail, only the operation of "Ap" is checked without checking the operation of "DB", and only the operation of "Web" is checked after "Ap" is recovered from the failure. As such, the cause of failure can be checked by the shortest route.

Note that the solution procedure generated by the solution-procedure generating unit 33 is used at, for example, a call center (or a help desk or customer support) as a procedure for solving failure troubles.

[Solution-Procedure Generation Process]

Figure 5:
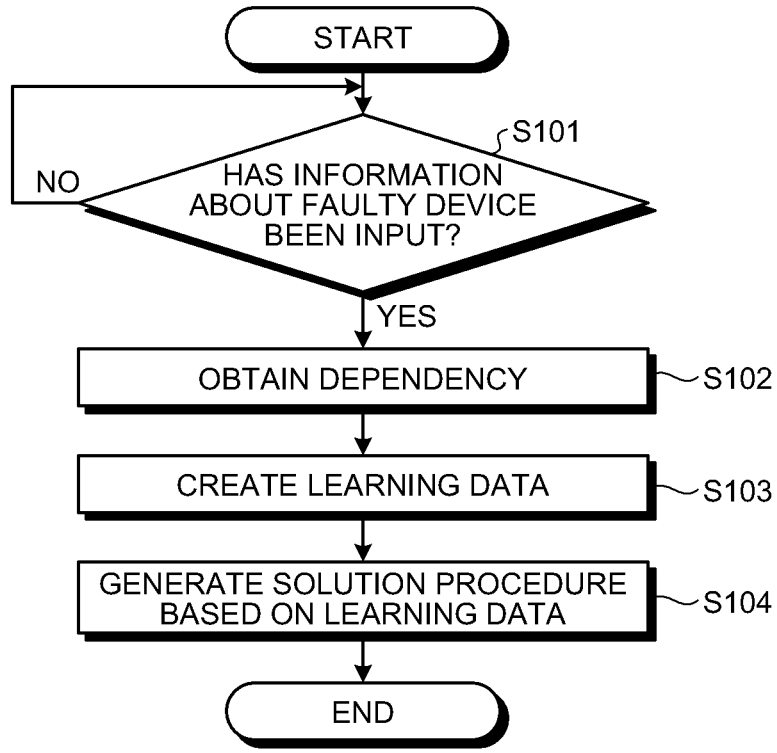
FIG. 5 is a flowchart for explaining the solution-procedure generation process according to the first embodiment.

Next, the solution-procedure generation process according to the first embodiment is explained with reference to FIG. 5. FIG. 5 is a flowchart for explaining the solution-procedure generation process according to the first embodiment. In the following, a process flow is explained when "Ap" and "DB" fail among "Web", "Ap", and "DB".

As depicted in FIG. 5, for example, when information about the faulty devices "Ap" and "DB" is input (Yes at Step S101), the supporting apparatus 10 obtains from the configuration-information storage unit 21 dependencies "Consumer: Web, Provider: Ap" and "Consumer: Ap, Provider: DB" among the devices "Web, Ap, DB" including the faulty devices "Ap" and "DB" (Step S102).

Then, based on the obtained dependencies "Consumer: Web, Provider: Ap" and "Consumer: Ap, Provider: DB" among the devices including the faulty devices and the information about the faulty devices "Ap" and "DB", the supporting apparatus 10 creates learning data with the dependencies and the cause of failure "DB" being associated with each other (Step S103).

Subsequently, based on the created learning data, the supporting apparatus 10 generates a solution procedure indicative of a procedure for specifying the cause of failure "DB" by using, for example, the algorithm "ID3" (Step S104). Note that the solution procedure generated by the supporting apparatus 10 is used at, for example, a call center (or a help desk or customer support), as a procedure for solving failure troubles.

[Learning-data Creation Process]

Figure 6:
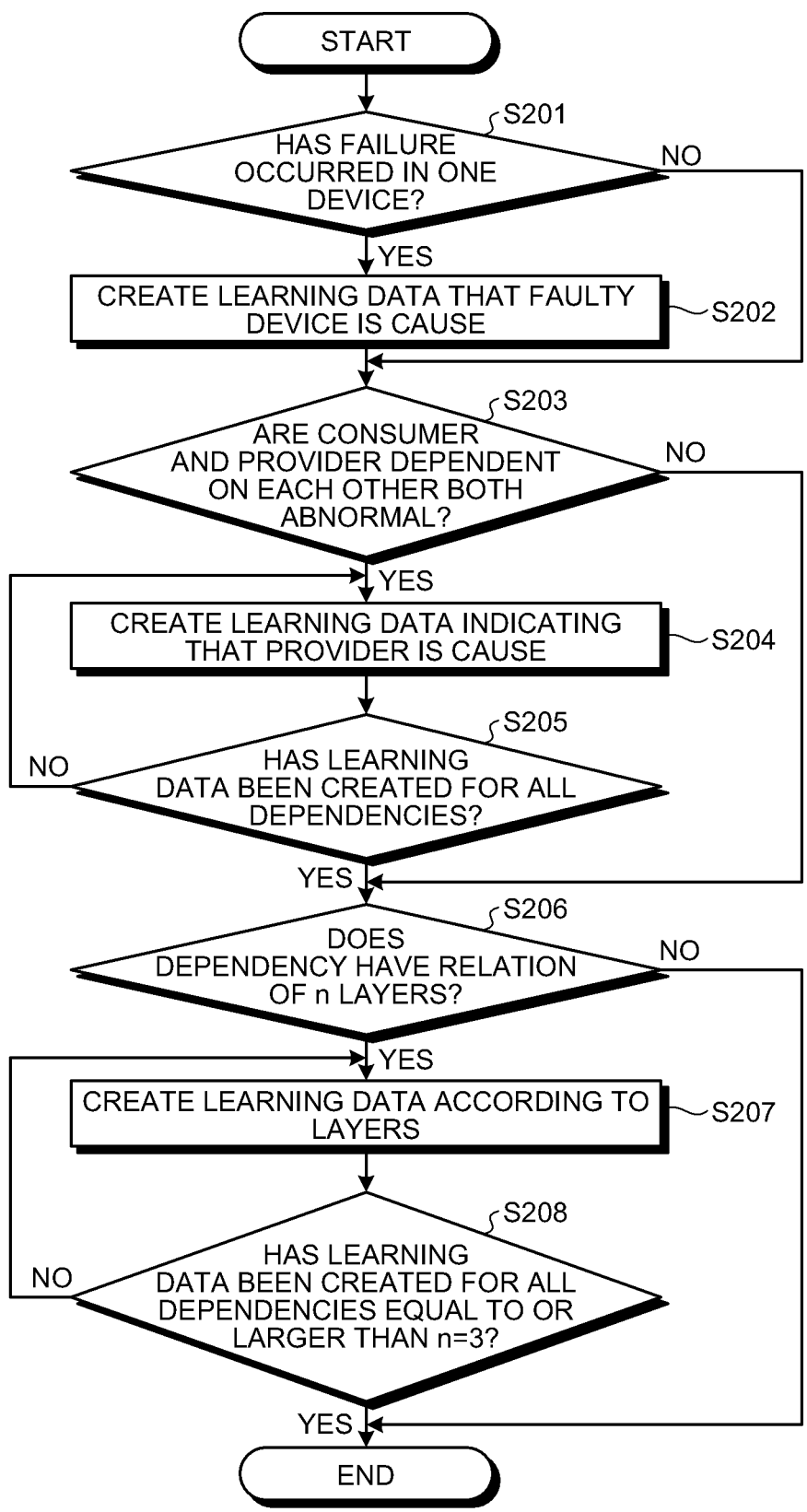
FIG. 6 is a flowchart for explaining a learning-data creation process according to the first embodiment.

Next, a learning-data creation process according to the first embodiment is explained with reference to FIG. 6. FIG. 6 is a flowchart for explaining the learning-data creation process according to the first embodiment. In the following, a case is explained in which the devices configured are "Web", "Ap", and "DB" and the dependencies among the devices are "Consumer: Web, Provider: Ap" and "Consumer: Ap, Provider: DB".

As depicted in FIG. 6, when only "Web" fails (Yes at Step S201), the supporting apparatus 10 creates learning data with "Web" taken as a cause of failure (Step S202). When the number of faulty devices is not one (No at Step S201), the supporting apparatus 10 performs a process at Step S203.

When the faulty devices are "Web" and "Ap" (Yes at Step S203), the supporting apparatus 10 creates learning data with "Ap", which is Provider, being taken as a cause of failure (Step S204).

Subsequently, if learning data has not yet been created for all dependencies (No at Step S205), the supporting apparatus 10 performs a process at Step S204. If learning data has been created for all dependencies (Yes at Step S205), the supporting apparatus 10 performs a process at Step S206. When the faulty devices are not those two having a dependency (No at Step S203), the supporting apparatus 10 performs a process at Step S206.

Then, when the faulty devices are "Web", "Ap", and "DB" (three layers) (Yes at Step S206), the supporting apparatus 10 creates learning data with "DB" serving as Provider, which is source, as a cause of failure (Step S207).

Then, if learning data has been created for all dependencies of n (n=3) layers or greater (Yes at Step S208), the supporting apparatus 10 ends the process. If learning data has not yet been created for all dependencies of n layers or greater (No at Step S208), the supporting apparatus 10 performs a process at Step S207. Also, when the dependency is not a relation of n layers (No at Step S206), the supporting apparatus 10 ends the process.

[Effects of First Embodiment]

As explained above, for shooting a failure trouble in one or more devices, the supporting apparatus 10 creates learning data based on the dependencies of the device configuration information, and generates a procedure for trouble solution from the created learning data. Therefore, a useful trouble solution procedure can be presented.

For example, in the configuration having "Web", "Ap", and "DB", when "Ap" and "DB" fail, the supporting apparatus 10 accepts information about these faulty devices "Ap" and "DB". The supporting apparatus 10 then obtains from the configuration-information storage unit 21 dependencies "Consumer: Web, Provider: Ap" and "Consumer: Ap, Provider: DB" among the devices "Web, Ap, DB" including the faulty devices "Ap" and "DB". Subsequently, based on the obtained dependencies among the devices including the faulty devices and the information about the faulty devices, the supporting apparatus 10 creates learning data with the dependencies and the cause of failure "DB" being associated with each other. Then, based on the created learning data, the supporting apparatus 10 generates a solution procedure indicative of a procedure for specifying the cause of failure "DB" by using, for example, the algorithm "ID3". As a result, the supporting apparatus 10 can present a useful trouble solution procedure.

Also, the supporting apparatus 10 creates learning data based on the obtained configuration information, and generates a solution procedure from the created learning data. Therefore, compared with the conventional technologies of manually creating a solution procedure, the time required for generating a solution procedure can be reduced.

Furthermore, the supporting apparatus 10 generates a solution procedure by using dependencies of configuration information. Therefore, in actual operation and maintenance, an optimum solution procedure can be generated. Furthermore, with generation of such an optimum solution procedure, the time required for manually correcting the generated solution procedure can be reduced.

[b] Second Embodiment

Meanwhile, in the first embodiment, the case of generating a solution procedure based on the learning data is explained. However, this is not meant to restrict the present invention, and a solution procedure can be generated by further using previous learning data indicative of a precedent of the occurrence of a failure of any device.

In the following second embodiment, a case is explained with reference to FIGS. 7 to 10 in which a solution procedure is generated based on learning data and previous learning data indicative of a precedent of the occurrence of a failure of a device. Note that part of the configuration and functionality of the supporting apparatus 10 according to the second embodiment is similar to those in the first embodiment and therefore is not explained herein, and the previous learning data and a solution-procedure generation process, with which the second embodiment is differentiated from the first embodiment, are explained below.

[Configuration of Supporting Apparatus]

Figures 7, 8:
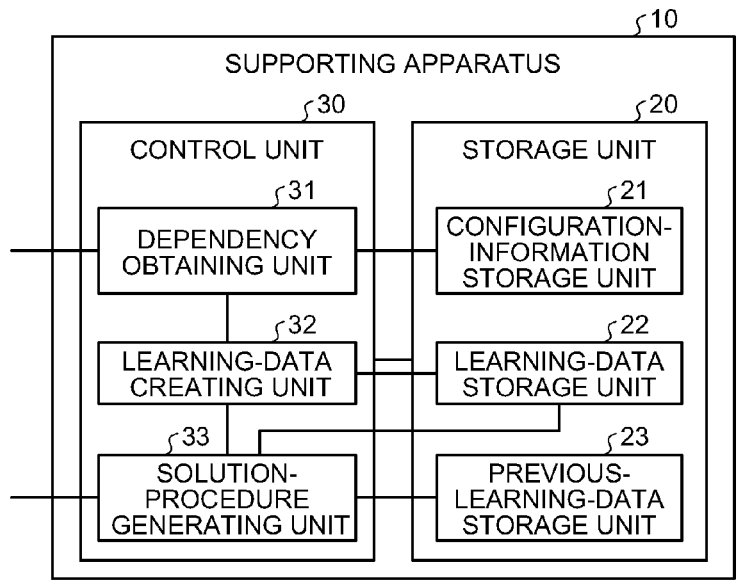
FIG. 7 is a diagram of an example of the configuration of a supporting apparatus according to a second embodiment.
FIG. 8 is a diagram of an example of information stored in a previous-learning-data storage unit according to the second embodiment.

The configuration of the supporting apparatus 10 according to the second embodiment is explained with reference to FIG. 7. FIG. 7 is a diagram of an example of the configuration of the supporting apparatus 10 according to the second embodiment.

As depicted in FIG. 7, the supporting apparatus 10 includes the storage unit 20 and the control unit 30, and is disposed in, for example, a call center that accepts inquiries from customers about a system configured of network devices, failure information of the system, and others.

The storage unit 20 has stored therein data required for various processes by the control unit 30 and various process results from the control unit 30, and particularly includes the configuration-information storage unit 21, the learning-data storage unit 22, and a previous-learning-data storage unit 23.

The previous-learning-data storage unit 23 has stored therein previous learning data indicative of a precedent of the occurrence of a failure of a device. Specifically, as depicted in FIG. 8, the previous-learning-data storage unit 23 has stored therein a configuration information name of a device to be obtained, having "operation of Web", "operation of Ap", and "operation of DB" dependent on each other and "cause of failure" in association with each other for each "case". FIG. 8 is a diagram of an example of information stored in the previous-learning-data storage unit 23 according to the second embodiment.

For example, as "case 1", the previous-learning-data storage unit 23 has stored therein "operation of Web: ○ (circle)", "operation of Ap: x (cross)", and "operation of DB: ○", and "cause of failure: Ap" in association with each other. Also for example, as "case 2", the previous-learning-data storage unit 23 has stored therein "operation of Web: ○", "operation of Ap: x", and "operation of DB: x", and "cause of failure: Ap" in association with each other. Furthermore, as "case 3", the previous-learning-data storage unit 23 has stored therein "operation of Web: ○", "operation of Ap: x", and "operation of DB: x", and "cause of failure: DB" in association with each other.

The information stored in the previous-learning-data storage unit 23 indicates a case of a failure that has actually occurred in any device configured. Therefore, as mentioned above, "cause of failure" is different between "case 2" and "case 3" even though the faulty portion is the same. That is, the previous learning data is not necessarily identical to the learning data created in a mechanical manner based on the dependencies of the configuration information.

The control unit 30 includes an internal memory for storing programs and necessary data having defined therein control programs, various process procedures, and others. Also, in particular, the control unit 30 includes a dependency obtaining unit 31, the learning-data creating unit 32, and a solution-procedure generating unit 33, with which various processes are performed.

Based on the learning data created by the learning-data creating unit 32 and the previous learning data indicative of a precedent of the occurrence of a failure of the device, the solution-procedure generating unit 33 generates a solution procedure indicative of a procedure for specifying a cause of failure.

Specifically, based on the learning data created by the learning-data creating unit 32 and the previous learning data stored in the previous-learning-data storage unit 23, the solution-procedure generating unit 33 generates a solution procedure indicative of a procedure for specifying a cause of failure by using, for example, the algorithm "ID3".

Figure 9:
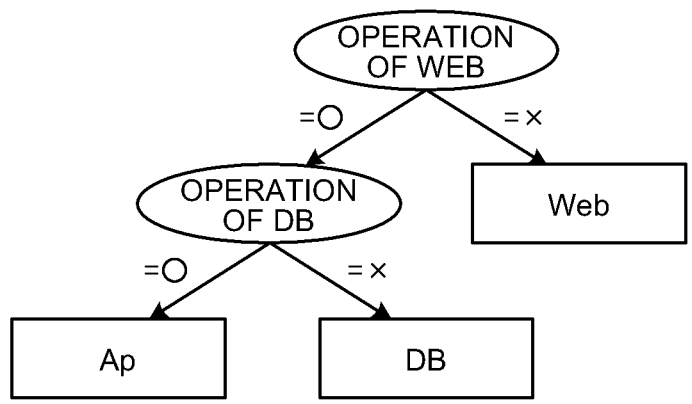
FIG. 9 is a diagram of an example of a solution procedure generated in a solution-procedure generation process according to the second embodiment.

The solution procedure generated by the solution-procedure generating unit 33 from the learning data depicted in FIG. 3 and the previous learning data depicted in FIG. 8 is such that, as depicted in FIG. 9, for example, "Web" is taken as a cause of failure when "Web" is not operated and the operation of "DB" is checked when "Web" is operated. Also, "DB" is taken as a cause of failure when "DB" is not operated and "Ap" is taken as a cause of failure when "DB" is operated. FIG. 9 is a diagram of an example of the solution procedure generated in a solution-procedure generation process according to the second embodiment.

That is, in the second embodiment, a solution procedure is generated based on the learning data created in a pseudo manner (not indicative of an actual case) with less data and the previous learning data created from an actual case with more data. Therefore, a solution procedure different from that in the first embodiment may be created in the second embodiment.

[Solution-procedure Generation Process]

Figure 10:
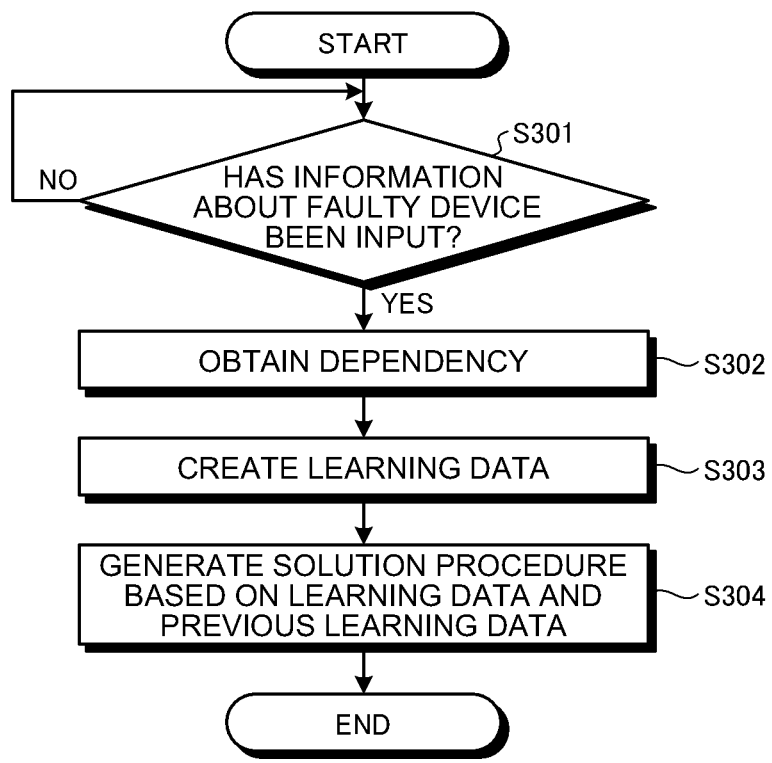
FIG. 10 is a flowchart for explaining the solution-procedure generation process according to the second embodiment.

Next, the solution-procedure generation process according to the second embodiment is explained with reference to FIG. 10. FIG. 10 is a flowchart for explaining the solution-procedure generation process according to the second embodiment. In the following, as with the first embodiment, a process flow is explained when "Ap" and "DB" fail among "Web", "Ap", and "DB".

As depicted in FIG. 10, for example, when information about the faulty devices "Ap" and "DB" is input (Yes at Step S301), the supporting apparatus 10 obtains from the configuration-information storage unit 21 dependencies "Consumer: Web, Provider: Ap" and "Consumer: Ap, Provider: DB" among the devices "Web, Ap, DB" including the faulty devices "Ap" and "DB" (Step S302).

Then, based on the obtained dependencies "Consumer: Web, Provider: Ap" and "Consumer: Ap, Provider: DB" among the devices including the faulty devices and the information about the faulty devices "Ap" and "DB", the supporting apparatus 10 creates learning data with the dependencies and the cause of failure "DB" being associated with each other (Step S303).

Subsequently, based on the created learning data and the previous learning data stored in the previous-learning-data storage unit 23, the supporting apparatus 10 generates a solution procedure indicative of a procedure for specifying the cause of failure "DB" by using, for example, the algorithm "ID3" (Step S304). Note that the solution procedure generated by the supporting apparatus 10 is used at, for example, a call center (or a help desk or customer support), as a procedure for solving failure troubles.

[Effects of Second Embodiment]

As explained above, for shooting a failure trouble in one or more devices, the supporting apparatus 10 creates learning data based on the dependencies of the device configuration information, and generates a procedure for trouble solution from the created learning data and the previous learning data indicative of a precedent of the occurrence of a failure. Therefore, a more useful trouble solution procedure can be presented.

In other words, the supporting apparatus 10 generates a solution procedure by further using the previous learning data with reliability higher than that of the learning data. Therefore, a more useful trouble solution procedure can be presented.

[c] Third Embodiment

Meanwhile, in the second embodiment, the case of generating a solution procedure by using the learning data and the previous learning data as they are is explained. However, this is not meant to restrict the present invention, and a solution procedure can be generated by using the learning data and the previous learning data at a predetermined ratio.

Specifically, the solution-procedure generating unit 33 uses the learning data created by the learning-data creating unit 32 and the previous learning data indicative of a precedent of the occurrence of a failure of a device at a predetermined ratio, thereby generating a solution procedure indicative of a procedure for specifying the cause of failure.

In the following third embodiment, a case is explained with reference to FIGS. 11 and 12 in which a solution procedure is generated by using the learning data and the previous learning data at a predetermined ratio. Note that part of the configuration and functionality of the supporting apparatus 10 according to the third embodiment is similar to those in the second embodiment and therefore is not explained herein, and a solution-procedure generation process, with which the third embodiment is differentiated from the second embodiment, is explained below.

[Solution-procedure Generation Process]

Next, the solution-procedure generation process according to the third embodiment is explained with reference to FIG. 11. FIG. 11 is a flowchart for explaining the solution-procedure generation process according to the third embodiment. In the following, as with the first embodiment, a process flow is explained when "Ap" and "DB" fail among "Web", "Ap", and "DB".

Figure 11:
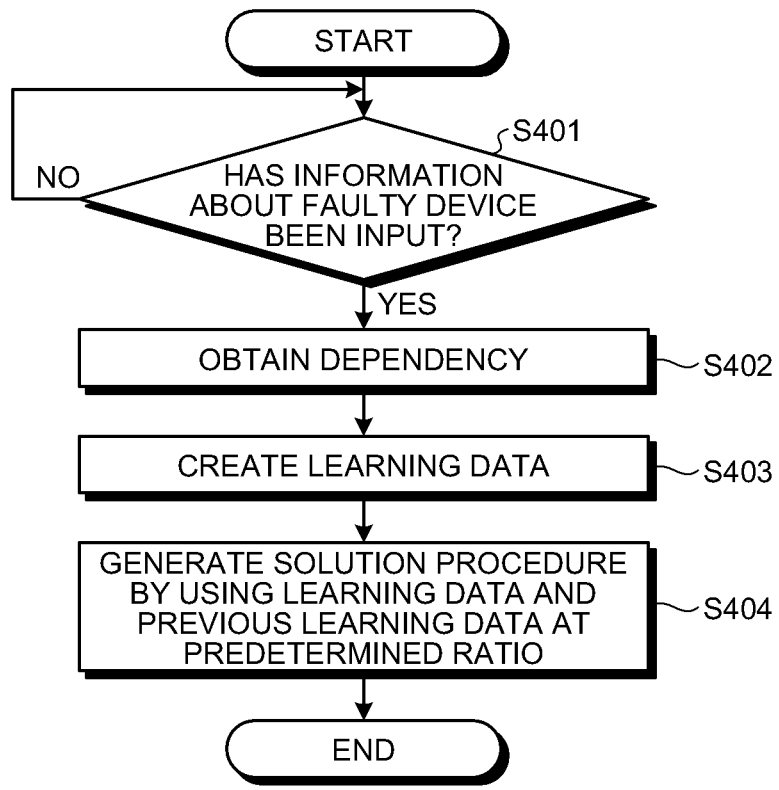
FIG. 11 is a flowchart for explaining a solution-procedure generation process according to a third embodiment.

As depicted in FIG. 11, for example, when information about the faulty devices "Ap" and "DB" is input (Yes at Step S401), the supporting apparatus 10 obtains from the configuration-information storage unit 21 dependencies "Consumer: Web, Provider: Ap" and "Consumer: Ap, Provider: DB" among the devices "Web, Ap, DB" including the faulty devices "Ap" and "DB" (Step S402).

Then, based on the obtained dependencies "Consumer: Web, Provider: Ap" and "Consumer: Ap, Provider: DB" among the devices including the faulty devices and the information about the faulty devices "Ap" and "DB", the supporting apparatus 10 creates learning data with the dependencies and the cause of failure "DB" being associated with each other (Step S403).

Subsequently, the supporting apparatus 10 uses the created learning data and the previous learning data stored in the pervious-learning-data storage unit 23 at a predetermined ratio (for example, learning data:previous learning data=5:5) to generate a solution procedure indicative of a procedure for specifying the cause of failure "DB" by using, for example, the algorithm "ID3" (Step S404). Note that the solution procedure generated by the supporting apparatus 10 is used at, for example, a call center (or a help desk or customer support), as a procedure for solving failure troubles.

Figure 12:
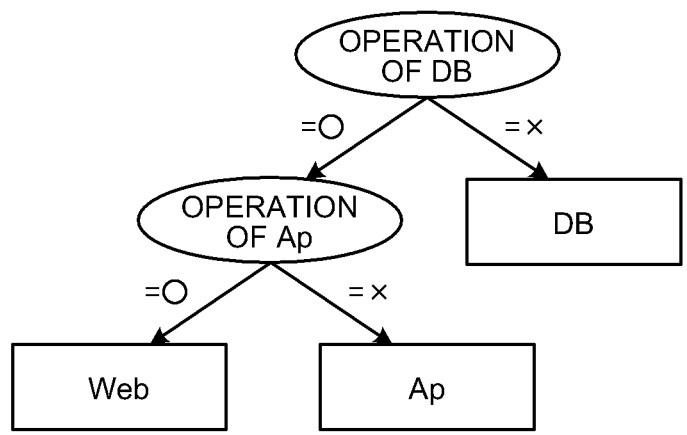
FIG. 12 is a diagram of an example of a solution procedure generated in a solution-procedure generation process according to the third embodiment.

The solution procedure generated by the solution-procedure generating unit 33 from the learning data depicted in FIG. 3 and the previous learning data depicted in FIG. 8 is such that, as depicted in FIG. 12, for example, "DB" is taken as a cause of failure when "DB" is not operated and the operation of "Ap" is checked when "DB" is operated. Also, the solution procedure is such that "Ap" is taken as a cause of failure when "Ap" is not operated and "Web" is taken as a cause of failure when "Ap" is operated. FIG. 12 is a diagram of an example of the solution procedure generated in a solution-procedure generation process according to the third embodiment.

The solution-procedure generation process using the predetermined ratio is explained in detail. For example, in the case of six pieces of learning data and eight pieces of previous learning data, the supporting apparatus 10 calculates a greatest common divisor of "2" between "6" and "8".

The supporting apparatus 10 then uses the calculated "2" to multiply the number of pieces of learning data by 4 (8/2=4) and multiply the number of pieces of previous learning data by 3 (6/2=3) to obtain 24 pieces of learning data (6×4=24) and 24 pieces of previous learning data (8×3=24). When the predetermined ratio is "5:5", the supporting apparatus 10 applies a total of 48 pieces of data including 24 pieces of learning data and 24 pieces of previous learning data to "ID3" to generate a solution procedure.

The predetermined ratio is not meant to be restricted to "5:5", and can be arbitrarily changed depending on, for example, the degree of reliability of the previous learning data and the number of pieces of learning data and previous learning data. For example, when the predetermined ratio is "m:n", "24×m" pieces of learning data and "24×n" pieces of previous learning data is applied to "ID3" to generate a solution procedure.

That is, in the third embodiment, a solution procedure is generated by using a predetermined ratio between the previous learning data prioritized in the absolute number of pieces of data and the learning data with less data. Therefore, a solution procedure different from that in the second embodiment may be generated in the third embodiment.

[Effects of Third Embodiment]

As explained above, the supporting apparatus 10 creates learning data from the dependencies of the configuration information, and uses the created learning data and the previous learning data at a predetermined ratio to generate a solution procedure. Therefore, a more useful trouble solution procedure can be generated.

[d] Fourth Embodiment

Meanwhile, in the second embodiment, the learning data and the previous learning data are used as they are to generate a solution procedure. However, the present invention is not meant to be restricted to this. Alternatively, a solution procedure can be generated by applying a weight to the previous learning data identical to the learning data for use.

Specifically, the solution-procedure generating unit 33 uses only the previous learning data when the number of pieces of previous learning data indicative of a precedent of the occurrence of a failure of a device is greater than a predetermined value, and applies a weight to previous learning data identical to the learning data created by the learning-data creating unit 32 for use, thereby generating a solution procedure indicative of a procedure for specifying a cause of failure.

In the following fourth embodiment, a case is explained with reference to FIGS. 13 to 15 in which a solution procedure is generated by applying a weight to previous learning data identical to learning data for use. Note that part of the configuration and functionality of the supporting apparatus 10 according to the fourth embodiment is similar to those in the second embodiment and therefore is not explained herein, and a solution-procedure generation process, with which the fourth embodiment is differentiated from the second embodiment, is explained below.

[Solution-procedure Generation Process]

The solution-procedure generation process according to the fourth embodiment is explained with reference to FIG. 13. FIG. 13 is a flowchart for explaining the solution-procedure generation process according to the fourth embodiment. In the following, as with the first embodiment, a process flow is explained when "Ap" and "DB" fail among "Web", "Ap", and "DB".

Figure 13:
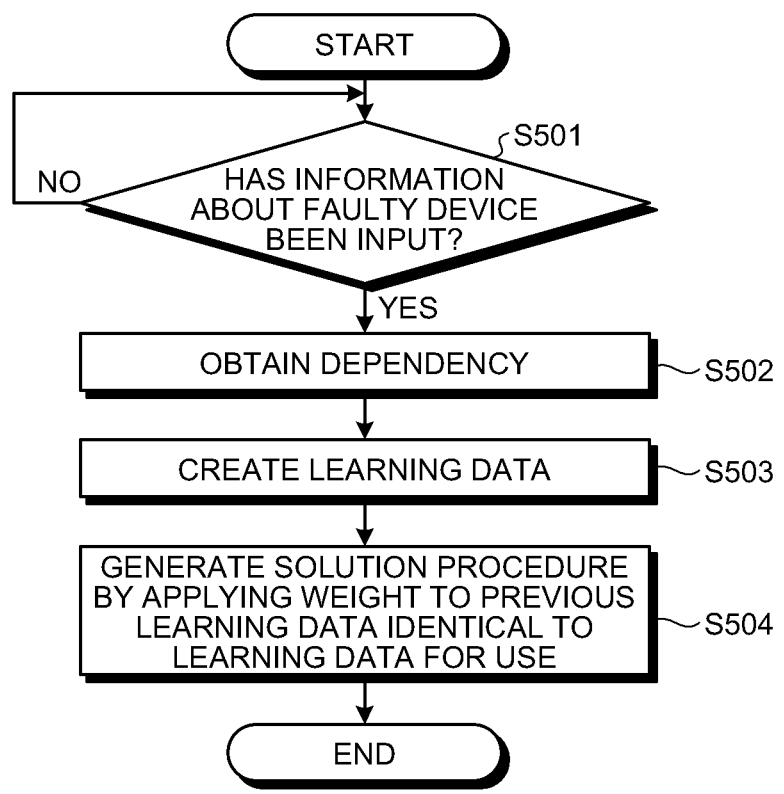
FIG. 13 is a flowchart for explaining a solution-procedure generation process according to a fourth embodiment.

As depicted in FIG. 13, for example, when information about the faulty devices "Ap" and "DB" is input (Yes at Step S501), the supporting apparatus 10 obtains from the configuration-information storage unit 21 dependencies "Consumer: Web, Provider: Ap" and "Consumer: Ap, Provider: DB" among the devices "Web, Ap, DB" including the faulty devices "Ap" and "DB" (Step S502).

Then, based on the obtained dependencies "Consumer: Web, Provider: Ap" and "Consumer: Ap, Provider: DB" among the devices including the faulty devices and the information about the faulty devices "Ap" and "DB", the supporting apparatus 10 creates learning data with the dependencies and the cause of failure "DB" being associated with each other (Step S503).

Subsequently, among the pieces of previous learning data stored in the previous-learning-data storage unit 23, the supporting apparatus 10 applies a weight to a piece of previous learning data identical to a piece of learning data stored in the learning-data storage unit 22 for use, thereby generating a solution procedure indicative of a procedure for specifying the cause of failure "DB" by using, for example, the algorithm "ID3" (Step S504). Note that the solution procedure generated by the supporting apparatus 10 is used at, for example, a call center (or a help desk or customer support), as a procedure for solving failure troubles.

In the solution-procedure generation process according to the fourth embodiment, the supporting apparatus 10 generates a solution procedure while applying a weight to pieces of previous learning data "case 1", "case 3", "case 4", "case 6", "case 7", and "case 8" that are identical to the learning data, among a plurality of cases of previous learning data. FIG. 14 is a diagram for explaining the solution-procedure generation process according to the fourth embodiment.

Figures 15, 16:
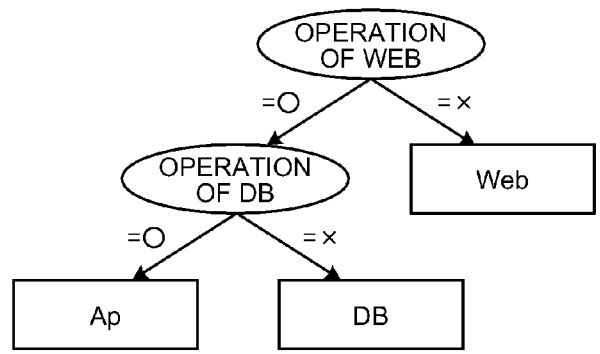
FIG. 15 is a diagram of an example of a solution procedure generated in the solution-procedure generation process according to the fourth embodiment.
FIG. 16 is a diagram of an example of information stored in a learning-data storage unit according to a fifth embodiment.

Also, the solution procedure generated by the solution-procedure generating unit 33 from the learning data and the previous learning data depicted in FIG. 14 is such that, as depicted in FIG. 15, for example, "Web" is taken as a cause of failure when "Web" is not operated and the operation of "DB" is checked when "Web" is operated. Also, the solution procedure is such that "DB" is taken as a cause of failure when "DB" is not operated and "Ap" is taken as a cause of failure when "DB" is operated. FIG. 15 is a diagram of an example of the solution procedure generated in a solution-procedure generation process according to the fourth embodiment.

That is, in the fourth embodiment, a solution procedure is generated by applying a weight to a piece of previous learning data identical to a piece of learning data more similar to an actual application scene, among pieces of previous learning data representing actual cases and having relatively high reliability. Therefore, a more useful solution procedure can be generated.

In other words, in the fourth embodiment, a solution procedure is generated by further applying a weight not to a piece of previous learning data not identical to any one piece of learning data and therefore (presumably) having a low reliability but to a piece of previous learning data identical to any one piece of learning data and therefore (presumably) having a high reliability. Therefore, a more useful solution procedure can be generated. Here, the weight to be applied to the previous learning data is set in advance by, for example, providing a double weight.

[Effects of Fourth Embodiment]

As explained above, the supporting apparatus 10 generates a solution procedure by applying a weight to previous learning data identical to learning data for use. Therefore, a more useful solution procedure can be generated.

[e] Fifth Embodiment

Meanwhile, in the second embodiment, the learning data and the previous learning data are used as they are to generate a solution procedure. However, the present invention is not meant to be restricted to this. Alternatively, a solution procedure can be generated by applying a weight to previous learning data according to the number of times of referring to learning data for use.

In the following fifth embodiment, a case is explained with reference to FIGS. 16 to 20 in which a solution procedure is generated by applying a weight to previous learning data according to the number of times of referring to learning data. Note that part of the configuration and functionality of the supporting apparatus 10 according to the fifth embodiment is similar to those in the second embodiment and therefore is not explained herein, and learning data, previous learning data, and a solution-procedure generation process, with which the fifth embodiment is differentiated from the second embodiment, are explained below.

[Configuration of the Supporting Apparatus]

Figures 17, 18:
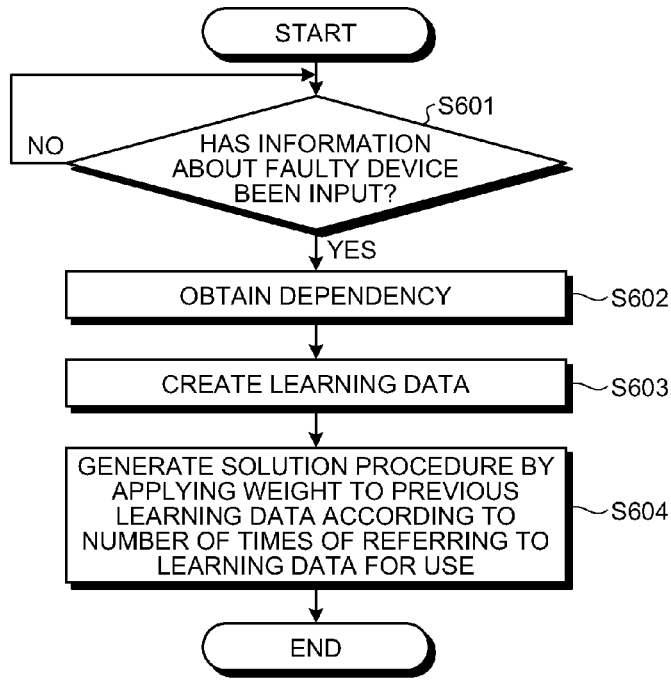
FIG. 17 is a diagram of an example of information stored in a previous-learning-data storage unit according to the fifth embodiment.
FIG. 18 is a flowchart for explaining a solution-procedure generation process according to the fifth embodiment.

Information stored in the learning-data storage unit 22 and the previous-learning-data storage unit 23 according to the fifth embodiment is explained with reference to FIGS. 16 and 17. FIG. 16 is a diagram of an example of information stored in the learning-data storage unit 22 according to the fifth embodiment. FIG. 17 is a diagram of an example of information stored in the previous-learning-data storage unit 23 according to the fifth embodiment.

The learning-data storage unit 22 has stored therein dependencies of the devices, a cause of failure, and the number of times of referring indicative of the number of times of referring to learning data, in association with each other. Specifically, as depicted in FIG. 16, the learning-data storage unit 22 has stored therein a configuration information name of a device to be obtained, having "operation of Web", "operation of Ap", and "operation of DB" dependent on each other, "cause of failure", and the "number of times of referring" in association with each other.

For example, the learning-data storage unit 22 has stored therein "operation of Web: x (cross)", "operation of Ap: ○(circle)", and "operation of DB: ○", "cause of failure: Web", and "number of times of referring: 2" in association with each other. Also, for example, the learning-data storage unit 22 has stored therein "operation of Web: ○", "operation of Ap: x", and "operation of DB: x", "cause of failure: DB", and "number of times of referring: 5" in association with each other. Still further, the learning-data storage unit 22 has stored therein "operation of Web: x", "operation of Ap: x", and "operation of DB: x", "cause of failure: DB", and "number of times of referring: 1" in association with each other.

The "number of times of referring" stored in the learning-data storage unit 22 indicates the number of times (counts) of referring to the learning data by the user using the supporting apparatus 10 after the creation of the learning data. At the time of a system failure or the like, the user refers to the learning-data storage unit 22 by using a predetermined dedicated function to solve the trouble.

In short, the learning data often referred to by the user is used often for solving a trouble in the system. Here, the number of times of referring stored in the learning-data storage unit 22 may be reset after a predetermined period elapses for the latest troubleshooting regarding device failures.

The previous-learning-data storage unit 23 has stored therein a precedent of the occurrence of a failure of a device and a magnifying power for applying a weight to that precedent in association with each other. Specifically, as depicted in FIG. 17, the previous-learning-data storage unit 23 has stored therein a configuration information name of a device to be obtained, having "operation of Web", "operation of Ap", and "operation of DB" dependent on each other, "cause of failure", and "magnifying power" in association with each other for each case.

For example, as "case 1", the previous-learning-data storage unit 23 has stored therein "operation of Web: ○", "operation of Ap: x", and "operation of DB: ○", "cause of failure: Ap", and "magnifying power: 3" in association with each other. Also for example, as "case 3", the previous-learning-data storage unit 23 has stored therein "operation of Web: ○", "operation of Ap: x", and "operation of DB: x", "cause of failure: DB", and "magnifying power: 5" in association with each other.

The solution-procedure generating unit 33 applies a weight to previous learning data stored in the previous-learning-data storage unit 23 according to the number of times of referring to learning data created by the learning-data creating unit 32 for use, thereby generating a solution procedure for specifying a cause of failure.

Specifically, the solution-procedure generating unit 33 determines a magnifying power (refer to FIG. 17) of a piece of previous learning data identical to a piece of learning data according to the number of times of referring the learning data created by the learning-data creating unit 32 (refer to FIG. 16). The solution-procedure generating unit 33 then uses the magnifying power for the previous learning data stored in the previous-learning-data storage unit 23 to generate a solution procedure indicative of a procedure for specifying a cause of failure by using, for example, the algorithm "ID3".

For example, according to learning data of "operation of Web: ○", "operation of Ap: x", and "operation of DB: x", "cause of failure: DB", and "magnifying power: 5" created by the learning-data creating unit 32, the solution-procedure generating unit 33 determines a magnifying power of "5" for previous learning data of "case 3" identical to that learning data.

The solution-procedure generating unit 33 then uses the magnifying power of "5" for the previous learning data of "case 3" stored in the previous-learning-data storage unit 23 to generate a solution procedure indicative of a procedure for specifying a cause of failure by using, for example, the algorithm "ID3".

[Solution-procedure Generation Process]

Next, the solution-procedure generation process according to the fifth embodiment is explained with reference to FIG. 18. FIG. 18 is a flowchart for explaining the solution-procedure generation process according to the fifth embodiment. In the following, as with the first embodiment, a process flow is explained when "Ap" and "DB" fail among "Web", "Ap", and "DB".

As depicted in FIG. 18, for example, when information about the faulty devices "Ap" and "DB" is input (Yes at Step S601), the supporting apparatus 10 obtains from the configuration-information storage unit 21 dependencies "Consumer: Web, Provider: Ap" and "Consumer: Ap, Provider: DB" among the devices "Web, Ap, DB" including the faulty devices "Ap" and "DB" (Step S602).

Then, based on the obtained dependencies "Consumer: Web, Provider: Ap" and "Consumer: Ap, Provider: DB" among the devices including the faulty devices and the information about the faulty devices "Ap" and "DB", the supporting apparatus 10 creates learning data with the dependencies and the cause of failure "DB" being associated with each other (Step S603).

Subsequently, according to the learning data of "operation of Web: ○", "operation of Ap: x", "operation of DB: x", and "number of times of referring: 5" of "cause of failure: DB", created by the learning-data creating unit 32, the supporting apparatus 10 determines a magnifying power of "5" for previous learning data of "case 3" identical to the learning data.

The supporting apparatus 10 then uses the magnifying power of "5" for the previous learning data of "case 3" stored in the previous-learning-data storage unit 23 to generate a solution procedure indicative of a procedure for specifying a cause of failure by using, for example, the algorithm "ID3" (Step S604). Note that the solution procedure generated by the supporting apparatus 10 is used at, for example, a call center (or a help desk or customer support), as a procedure for solving failure troubles.

In the solution-procedure generation process according to the fifth embodiment, as depicted in FIG. 19, for example, the supporting apparatus 10 generates a solution procedure while applying a weight to pieces of previous learning data "case 1", "case 3", "case 4", "case 6", "case 7", and "case 8" that are identical to the learning data, among a plurality of cases of previous learning data according to the number of times of referring to the learning data. FIG. 19 is a diagram for explaining the solution-procedure generation process according to the fifth embodiment.

Also, the solution procedure generated by the solution-procedure generating unit 33 from the learning data and the previous learning data depicted in FIG. 19 is such that, as depicted in FIG. 20, for example, "Web" is taken as a cause of failure when "Web" is not operated and the operation of "DB" is checked when "Web" is operated. Also, the solution procedure is such that "DB" is taken as a cause of failure when "DB" is not operated and "Ap" is taken as a cause of failure when "DB" is operated. FIG. 20 is a diagram of an example of the solution procedure generated in the solution-procedure generation process according to the fifth embodiment.

That is, in the fifth embodiment, a solution procedure is generated by applying a weight to previous learning data identical to learning data often used with a large number of times of referring by the user for trouble solution in the system. Therefore, a more useful solution procedure can be generated.

In other words, in the fifth embodiment, a solution procedure is generated by applying a weight to a piece of previous learning data identical to a piece of learning data with a large number of times of referring and therefore (presumably) having a high reliability, among pieces of learning data created in a mechanical manner. Therefore, a more useful solution procedure can be generated.

[Effects of Fifth Embodiment]

As explained above, the supporting apparatus 10 determines a weight to be applied to previous learning data identical to learning data according to the number of times of referring to the learning data, and uses the determined weight to generate a solution procedure. Therefore, a more useful solution procedure can be generated.

[f] Other Embodiments

While the embodiments of the present invention have been explained, the present invention may be implemented in various different forms other than the embodiments explained above. In the following, embodiments different in (1) extraction of dependencies among layers, (2) extraction of network topology, (3) configuration of the supporting apparatus, and (4) program are explained.

(1) Extraction of Dependencies Among Layers

In the first embodiment, a solution procedure is generated based on the dependencies among the devices and the device information. However, the present invention is not restricted to this. Alternatively, a solution procedure can be generated based on the dependencies among a plurality of layers in a prescribed device as a cause of failure in the generated solution procedure and the information about the prescribed device.

In the following, a process of extracting dependencies among layers to generate a solution procedure is explained by using FIG. 21A. FIG. 21A is a diagram for explaining a process of extracting dependencies among layers to generate a solution procedure.

Note that part of the configuration and functionality of the supporting apparatus 10 herein is similar to those in the first embodiment and therefore is not explained herein, and information stored in the configuration-information storage unit 21 and a solution-procedure generation process, with which the present embodiment is differentiated from the first embodiment, are explained below. In the following, a case is explained in which a prescribed device as a cause of failure in the solution procedure generated in the first embodiment is depicted in a left portion of FIG. 21A, where a layer of "task 100" of the prescribed device and a layer of "task 200" of a different device communicate with each other.

In the configuration explained above, the supporting apparatus 10 has stored therein a list of devices, dependencies among the devices, and further dependencies among a plurality of layers in a prescribed device. The supporting apparatus 10 obtains from the configuration-information storage unit 21 dependencies in the prescribed device as a cause of failure in the created solution procedure. Based on the obtained dependencies in the prescribed device and the information about the prescribed device, the supporting apparatus 10 further generates a solution procedure indicative of a procedure for specifying a cause of failure in the prescribed device.

Specifically, the configuration-information storage unit 21 has stored therein a list of devices and dependencies among the devices depicted in FIG. 2 and further dependencies among a plurality of layers of "task 100, application 101, middleware 102, Operating System (OS) 103, and hardware 104" in a prescribed device (such as a server)(refer to FIG. 21B). As with the first embodiment, the information stored in the configuration-information storage unit 21 is input in advance manually or the like. FIG. 21B is a diagram of an example of dependencies among a plurality of layers in a prescribed device.

The solution-procedure generating unit 33 obtains from the configuration-information storage unit 21 dependencies in a prescribed device (left portion of FIG. 21A) as a cause of failure in the solution procedure generated in the first embodiment. Subsequently, when "task 100", "application 100", and "middleware 102" fail, the solution-procedure generating unit 33 further generates a solution procedure indicative of a procedure for specifying a cause of failure "middleware 102" in the prescribed device based on the obtained dependencies in the prescribed device and failure information in the layers of the prescribed device (indicative of the occurrence of a failure in the task 100 to the middleware 102).

When "task 100" and "application 101" fail, the solution-procedure generating unit 33 further generates a solution procedure for specifying "application 101" as a cause of failure.

That is, when making a failure determination from an upper layer (task) among the layers in the prescribed device as a cause of failure among the devices, the supporting apparatus 10 generates a solution procedure with a layer immediately preceding the layer determined as normal being determined as a cause of failure. Therefore, a more detailed trouble solution procedure can be generated.

(2) Extraction of Network Topology

Also in the first embodiment, a solution procedure is generated based on the dependencies among the devices and the device information. However, the present invention is not restricted to this. Alternatively, a solution procedure can be generated based on the dependencies among the devices, a connection form, and device information.

Figure 22:
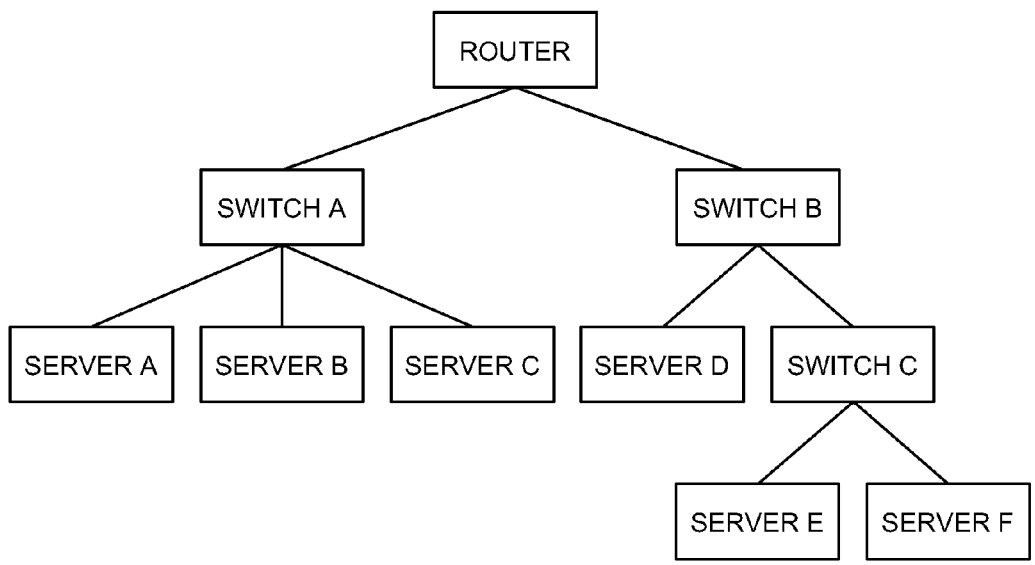
FIG. 22 is a diagram for explaining a process of extracting a network topology to generate a solution procedure.

A process of extracting a network topology to generate a solution procedure is explained below with reference to FIG. 22. FIG. 22 is a diagram for explaining the process of extracting a network topology to generate a solution procedure.

Note that part of the configuration and functionality of the supporting apparatus 10 is similar to those in the first embodiment and therefore is not explained herein, and information stored in the configuration-information storage unit 21 and a solution-procedure generation process, with which the present embodiment is differentiated from the first embodiment, are explained below.

In the following, a solution-procedure generation process when a server A and a server B fail in a network formed of a router, switches A to C, and server A to F depicted in FIG. 22 is explained.

In the configuration explained above, the supporting apparatus 10 has stored therein a list of devices and dependencies among the devices, and further a connection form in the list of the devices. The supporting apparatus 10 obtains from the configuration-information storage unit 21 dependencies among the devices including faulty devices and a connection form. Subsequently, based on the obtained dependencies among the devices including faulty devices and connection form and information about the faulty devices, the supporting apparatus 10 creates learning data with the dependencies and the cause of failure being associated with each other. Then, based on the created learning data, the supporting apparatus 10 generates a solution procedure indicative of a procedure for specifying a cause of failure.

Specifically, the configuration-information storage unit 21 has stored therein a list of devices and dependencies among the devices depicted in FIG. 2, and further a connection form (network topology) in the list of the devices. The network topology stored in the configuration-information storage unit 21 is such that, for example, as depicted in FIG. 22, the switches A and B are under the router, the servers A to C are under the switch A, the server D and the switch C are under the switch B, and the servers E and F are under the switch C.

The dependency obtaining unit 31 then obtains from the configuration-information storage unit 21a dependency "Provider: switch A, Consumer: server A, server B, server C" among the devices including the faulty devices "server A" and "server B" and a connection form "servers A to C are under the switch A".

Subsequently, based on the obtained dependencies among the devices including the faulty devices and connection form and information about the faulty devices "server A" and "server B", the learning-data creating unit 32 creates learning data with the dependency and a cause of failure being associated with each other.

The learning data created by the learning-data creating unit 32 is explained in detail. For example, in FIG. 22, when "server A" and "server B" fail, according to learning data creation in the first embodiment, "switch A", which is Provider, is determined as a cause of failure.

However, since "server C" does not fail, "server A" and "server B" are each actually assumed to be a cause of failure instead of "switch A". Therefore, the learning-data creating unit 32 uses not only the dependency but further the connection relation and the information about faulty devices to derive learning data indicating that "server A" and "server B" are causes of failure.

Then, based on the learning data created by the learning-data creating unit 32, the solution-procedure generating unit 33 generates a solution procedure indicative of a procedure for specifying a cause of failure. Here, the solution procedure generated by the solution-procedure generating unit 33 is such that, as explained above, "server A" is taken as a cause of failure when "server A" is not operated and "server B" is taken as a cause of failure when "server A" is operated.

That is, the supporting apparatus 10 generates learning data based on the dependency among the devices and the connection relation (network topology) and the information about the faulty devices. Therefore, a more useful trouble solution procedure can be generated.

(3) Configuration of Supporting Apparatus

The process procedure, the control procedure, specific names, and information including various data and parameters (for example, the information stored in the "configuration-information storage unit 21" depicted in FIG. 1) explained in the specification and depicted in the drawings can be arbitrarily changed unless otherwise specified.

Each component of each device depicted is conceptual in function, and is not necessarily physically configured as depicted. That is, the specific patterns of distribution and unification of the components are not meant to be restricted to those depicted in the drawings. For example, "the dependency obtaining unit 31" and "the learning-data creating unit 32" may be unified into a "learning-data creating unit" that obtains dependencies among the devices including a faulty device to create learning data. As such, all or part of the components can be functionally or physically distributed or unified in arbitrary units according to various loads and the state of use. Furthermore, all or arbitrary part of the process functions performed in each component can be achieved by a Central Processing Unit (CPU) and a program analyzed and executed on that CPU, or can be achieved as hardware with a wired logic.

(4) Program

Figure 23:
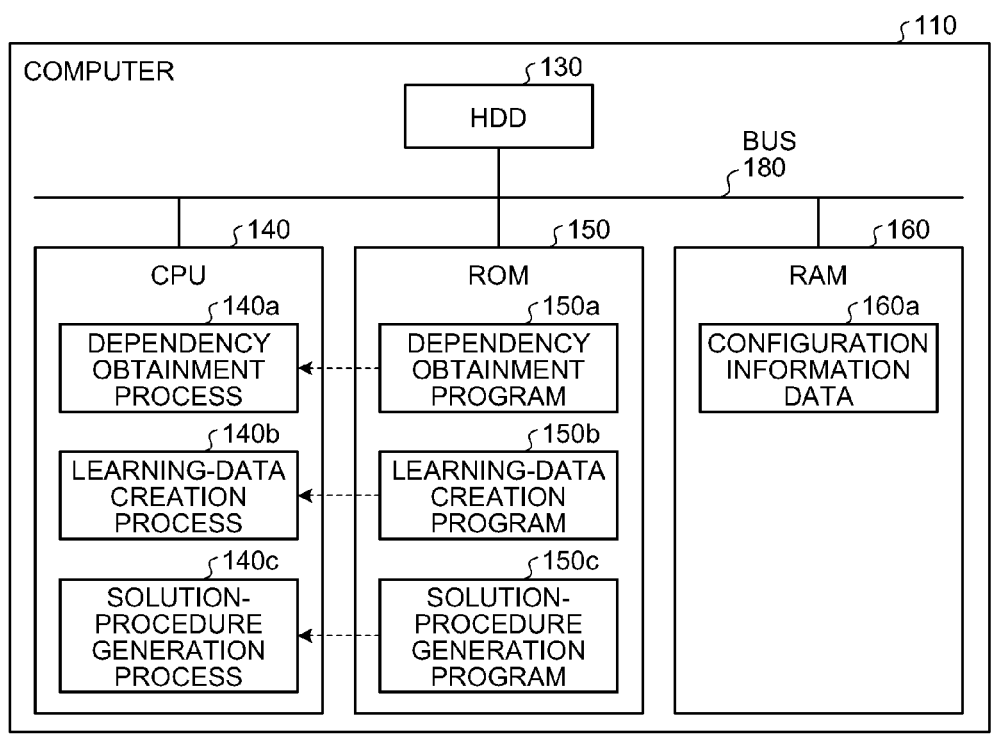
FIG. 23 is a diagram of a computer executing a support program.
Figure 24:
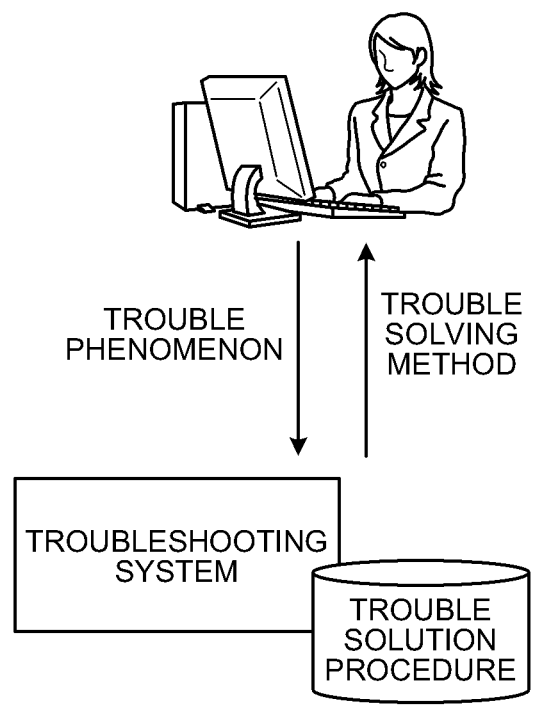
FIG. 24 is a diagram for explaining a troubleshooting system according to a conventional technology.
Figure 25:
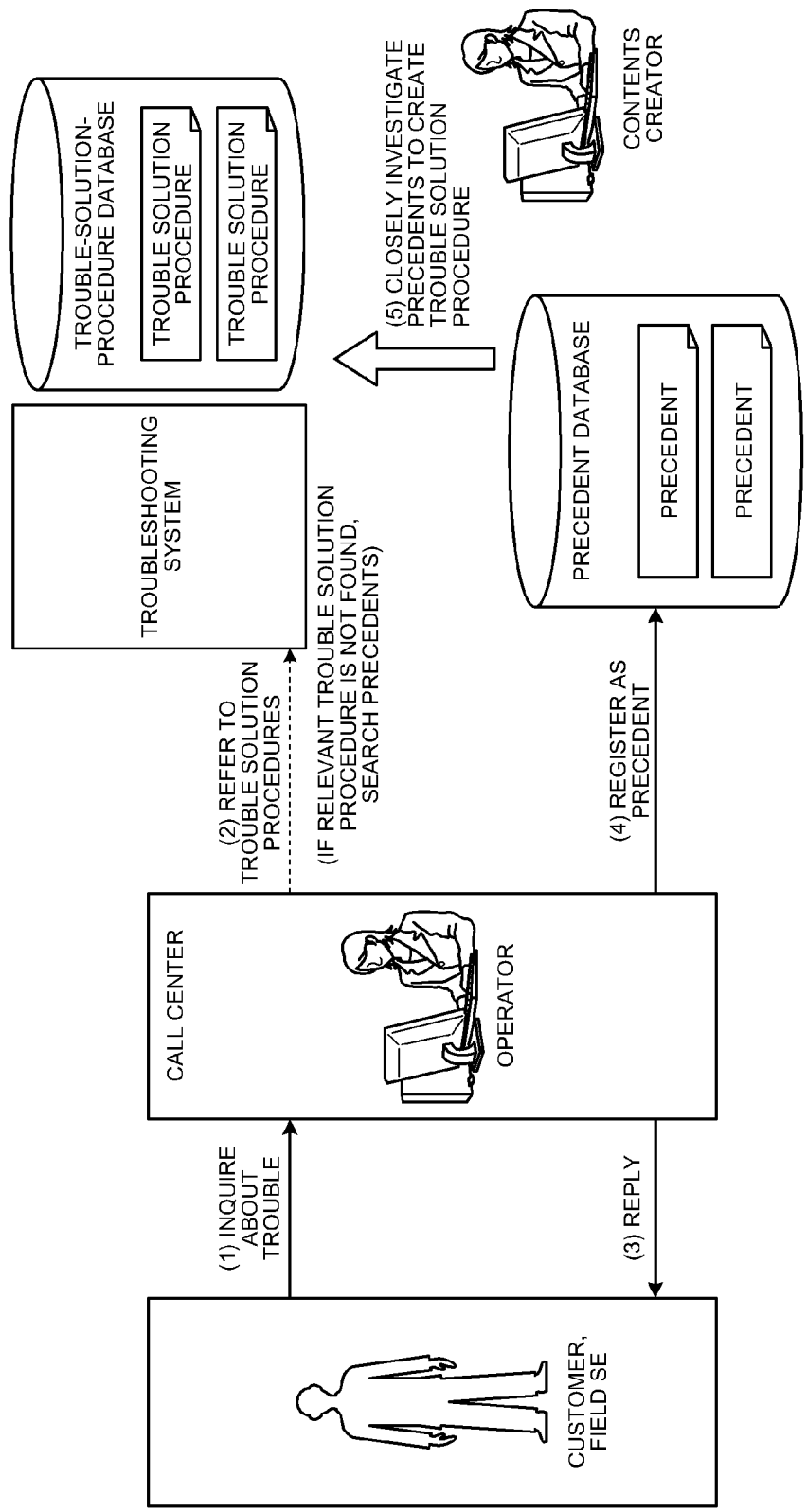
FIG. 25 is a diagram for explaining the case in which the troubleshooting system according to the conventional technology is applied to a call center.

Meanwhile, in the embodiments explained above, various processes are achieved by a hardware logic. However, the present invention is not meant to be restricted to this, and may be achieved by executing a program provided in advance on a computer. In the following, an example of a computer executing a support program having functions similar to those of the supporting apparatus 10 explained in the embodiments above is explained with reference to FIG. 23. FIG. 23 is a diagram of a computer executing a support program.

As depicted in FIG. 23, a computer 110 as a supporting apparatus includes a Hard Disk Drive (HDD) 130, a CPU 140, a Read-Only Memory (ROM) 150, and a Random Access Memory (RAM) 160, which are connected via a bus 180 or the like.

In the ROM 150, support programs achieving functions similar to those of the supporting apparatus 10 explained in the first embodiment are stored in advance, that is, a dependency obtainment program 150a, a learning-data creation program 150b, and a solution-procedure generation program 150c as depicted in FIG. 23. As with the components of the supporting apparatus 10 depicted in FIG. 1, these programs 150a to 150c may be unified or distributed as appropriate.

With the CPU 140 reading these programs 150a to 150c from the ROM 150 for execution, as depicted in FIG. 23, these programs 150a to 150c function as a dependency obtainment process 140a, a learning-data creation process 140b, and a solution-procedure generation process 140c. These processes 140a to 140c correspond to the dependency obtaining unit 31, the learning-data creating unit 32, and the solution-procedure generating unit 33, respectively, depicted in FIG. 1.

The CPU 140 executes the support program based on configuration information data 160a recorded in the RAM 160.

Note that the programs 150a to 150c are not necessarily stored in the ROM 150 from the start, and may be stored in a "portable physical medium" inserted in the computer 110, such as a flexible disk (FD), compact-disk read only memory (CD-ROM), digital versatile disk (DVD) magneto-optical disk, or Integrated Circuit (IC) card; a "fixed physical medium" inside or outside of the computer 110, such as an HDD; or further "another computer (or server)" connected to the computer 110 via a public line, the Internet, a Local Area Network (LAN), or a Wide Area Network (WAN), and be read by the computer 110 therefrom for execution.

According to the support program, supporting apparatus, and supporting method disclosed herein, an effect of presenting a useful trouble solution procedure can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer readable storage medium containing instructions that, when executed by a computer, cause the computer to perform:

obtaining, from a configuration-information storage unit that stores therein dependencies that are indicative of a user side and a provider side among devices in association with a list of the devices, a dependency that is indicative of the user side and the provider side among devices including a faulty device;

creating, based on the obtained dependency among the devices including the faulty device and information about the faulty device, learning data including the dependency and a cause of failure which are associated with each other;

generating, based on the created learning data, a solution procedure indicative of a procedure for specifying the cause of failure; and specifying a device serving as the provider side, which is a source, as the cause of failure among devices among which the faulty device has the dependency, based on the solution procedure, wherein the generating includes generating the solution procedure based on the learning data created in a pseudo manner at the creating and previous learning data that indicates a case of a failure that has actually occurred in the past in a configured device and that is not identical to the learning data created in a mechanical manner based on the dependencies of configuration information.

2. The non-transitory computer readable storage medium according to claim 1, wherein the generating includes generating the solution procedure by using the created learning data and the previous learning data at a predetermined ratio.

3. The non-transitory computer readable storage medium according to claim 1, wherein the generating includes generating the solution procedure by using only the previous learning data when the number of pieces of the previous learning data is greater than a predetermined value, and by using a piece of the previous learning data which is identical to a piece of the created learning data and to which a weight is applied.

4. The non-transitory computer readable storage medium according to claim 1, wherein the generating includes generating the solution procedure by using the previous learning data to which a weight is applied according to the number of times of referring to the created learning data.

5. The non-transitory computer readable storage medium according to claim 1, wherein
the configuration-information storage unit has further stored therein a dependency among a plurality of layers in a prescribed device, and
the generating includes
obtaining a dependency in the prescribed device as a cause of failure in the generated solution procedure from the configuration-information storage unit; and
further generating a solution procedure indicative of a procedure for specifying a cause of failure in the prescribed device based on the obtained dependency in the prescribed device and information about the prescribed device.

6. The non-transitory computer readable storage medium according to claim 1, wherein
the configuration-information storage unit has further stored therein a connection form in the list of the devices,
the obtaining includes obtaining the dependency among the device including the faulty device and the connection form from the configuration-information storage unit, and
the creating includes creating, based on the dependency among the device including the faulty device and the obtained connection form and based on the information about the faulty device, the learning data including the dependency and the cause of failure which are associated with each other.

7. A supporting apparatus comprising:
a configuration-information storage unit that stores therein dependencies that are indicative of a user side and a provider side among devices in association with a list of the devices;
a dependency obtaining unit that obtains a dependency that is indicative of the user side and the provider side among devices including a faulty device from the configuration-information storage unit;
a learning-data creating unit that creates, based on the obtained dependency among the devices including the faulty device and information about the faulty device, learning data including the dependency and a cause of failure which are associated with each other;
a solution-procedure generating unit that generates, based on the created learning data, a solution procedure indicative of a procedure for specifying the cause of failure; and
a device specifying unit that specifies a device serving as the provider side, which is a source, as the cause of failure among devices among which the faulty device has the dependency, based on the solution procedure, wherein
the solution-procedure generating unit generates the solution procedure based on the learning data created in a pseudo manner by the learning-data creating unit and previous learning data that indicates a case of a failure that has actually occurred in the past in a configured device and that is not identical to the learning data created in a mechanical manner based on the dependencies of configuration information.

8. The supporting apparatus according to claim 7, wherein the solution-procedure generating unit generates the solution procedure by using the created learning data and the previous learning data at a predetermined ratio.

9. The supporting apparatus according to claim 7, wherein the solution-procedure generating unit generates the solution procedure by using only the previous learning data when the number of pieces of the previous learning data is greater than a predetermined value, and by using a piece of the previous learning data which is identical to a piece of the created learning data and to which a weight is applied.

10. The supporting apparatus according to claim 7, wherein
the configuration-information storage unit has further stored therein a dependency among a plurality of layers in a prescribed device, and
the solution-procedure generating unit obtains a dependency in the prescribed device as a cause of failure in the generated solution procedure from the configuration-information storage unit, and further generates a solution procedure indicative of a procedure for specifying a cause of failure in the prescribed device based on the obtained dependency in the prescribed device and information about the prescribed device.

11. The supporting apparatus according to claim 7, wherein
the configuration-information storage unit has further stored therein a connection form in the list of the devices,
the solution-procedure generating unit obtains the dependency among the device including the faulty device and the connection form from the configuration-information storage unit, and
the learning-data creating unit creates, based on the dependency among the device including the faulty device and the obtained connection form and based on the information about the faulty device, the learning data including the dependency and the cause of failure which are associated with each other.

12. A supporting method comprising:
obtaining, from a configuration-information storage unit that stores therein dependencies that are indicative of a user side and a provider side among devices in association with a list of the devices, a dependency that is indicative of the user side and the provider side among devices including a faulty device;

creating, based on the obtained dependency among the devices including the faulty device and information about the faulty device, learning data including the dependency and a cause of failure which are associated with each other;

generating, based on the created learning data, a solution procedure indicative of a procedure for specifying the cause of failure; and specifying a device serving as the provider side, which is a source, as the cause of failure among devices among which the faulty device has the dependency, based on the solution procedure, wherein the generating includes generating the solution procedure based on the learning data created in a pseudo manner at the creating and previous learning data that indicates a case of a failure that has actually occurred in the past in a configured device and that is not identical to the learning data created in a mechanical manner based on the dependencies of configuration information.

13. The supporting method according to claim 12, wherein the generating includes generating the solution procedure by using the created learning data and the previous learning data at a predetermined ratio.

14. The supporting method according to claim 12, wherein the generating includes generating the solution procedure by using only the previous learning data when the number of pieces of the previous learning data is greater than a predetermined value, and by using a piece of the previous learning data which is identical to a piece of the created learning data and to which a weight is applied.

15. The supporting method according to claim 12, wherein the generating includes generating the solution procedure by using the previous learning data to which a weight is applied according to the number of times of referring to the created learning data.

16. The supporting method according to claim 12, wherein the configuration-information storage unit has further stored therein a dependency among a plurality of layers in a prescribed device, and the generating includes obtaining a dependency in the prescribed device as a cause of failure in the generated solution procedure from the configuration-information storage unit; and further generating a solution procedure indicative of a procedure for specifying a cause of failure in the prescribed device based on the obtained dependency in the prescribed device and information about the prescribed device.

17. The supporting method according to claim 12, wherein the configuration-information storage unit has further stored therein a connection form in the list of the devices, the obtaining includes obtaining the dependency among the device including the faulty device and the connection form from the configuration-information storage unit, and the creating includes creating, based on the dependency among the device including the faulty device and the obtained connection form and based on the information about the faulty device, the learning data including the dependency and the cause of failure which are associated with each other.

* * * * *